(No Model.) 7 Sheets—Sheet 2.
R. H. LITTLE.
RAILWAY.

No. 449,126. Patented Mar. 31, 1891.

Fig. 2.

Witnesses:
Harry T. Jones.
Albert H. Adams.

Inventor:
Robert H. Little (No Model.) 7 Sheets—Sheet 3.

R. H. LITTLE.
RAILWAY.

No. 449,126. Patented Mar. 31, 1891.

Witnesses:
Inventor:
Robert H. Little (No Model.) 7 Sheets—Sheet 4.
R. H. LITTLE.
RAILWAY.

No. 449,126. Patented Mar. 31, 1891.

Witnesses: Inventor:
Albert H. Adams Robert H. Little
Harry T. Jones (No Model.) 7 Sheets—Sheet 5.
R. H. LITTLE.
RAILWAY.

No. 449,126. Patented Mar. 31, 1891.

Witnesses:
Albert H. Adams
Harry T. Jones

Inventor:
Robert H. Little (No Model.) 7 Sheets—Sheet 6.
R. H. LITTLE.
RAILWAY.

No. 449,126. Patented Mar. 31, 1891.

Fig. 9

Witnesses:
Albert H. Adams.
Harry T. Jones.

Inventor:
Robert H. Little.

(No Model.) 7 Sheets—Sheet 7.

R. H. LITTLE.
RAILWAY.

No. 449,126. Patented Mar. 31, 1891.

Witnesses:
Harry F. Jones.
Albert H. Adams.

Inventor:
Robert H. Little

UNITED STATES PATENT OFFICE.

ROBERT H. LITTLE, OF CYPRUS RIVER, CANADA, ASSIGNOR TO HIMSELF AND EDWARD P. DONNELL, OF CHICAGO, ILLINOIS.

RAILWAY.

SPECIFICATION forming part of Letters Patent No. 449,126, dated March 31, 1891.

Application filed September 23, 1889. Renewed September 4, 1890. Serial No. 363,894. (No model.)

*To all whom it may concern:*

Be it known that I, ROBERT H. LITTLE, residing at Cyprus River, in the county of Marquette, Province of Manitoba, and Dominion of Canada, and a subject of the Queen of Great Britain, have invented a new and Improved Railway, of which the following is a specification, reference being had to the accompanying drawings, in which—

The object of this invention is to provide a new and improved means and apparatus for carrying passengers from one station or point to another in cities or other populous districts by means of a continuously-moving carrier adapted to convey passengers from one point to another without the use of cars or other appliances requiring separate motors for their propulsion.

Figure 1:
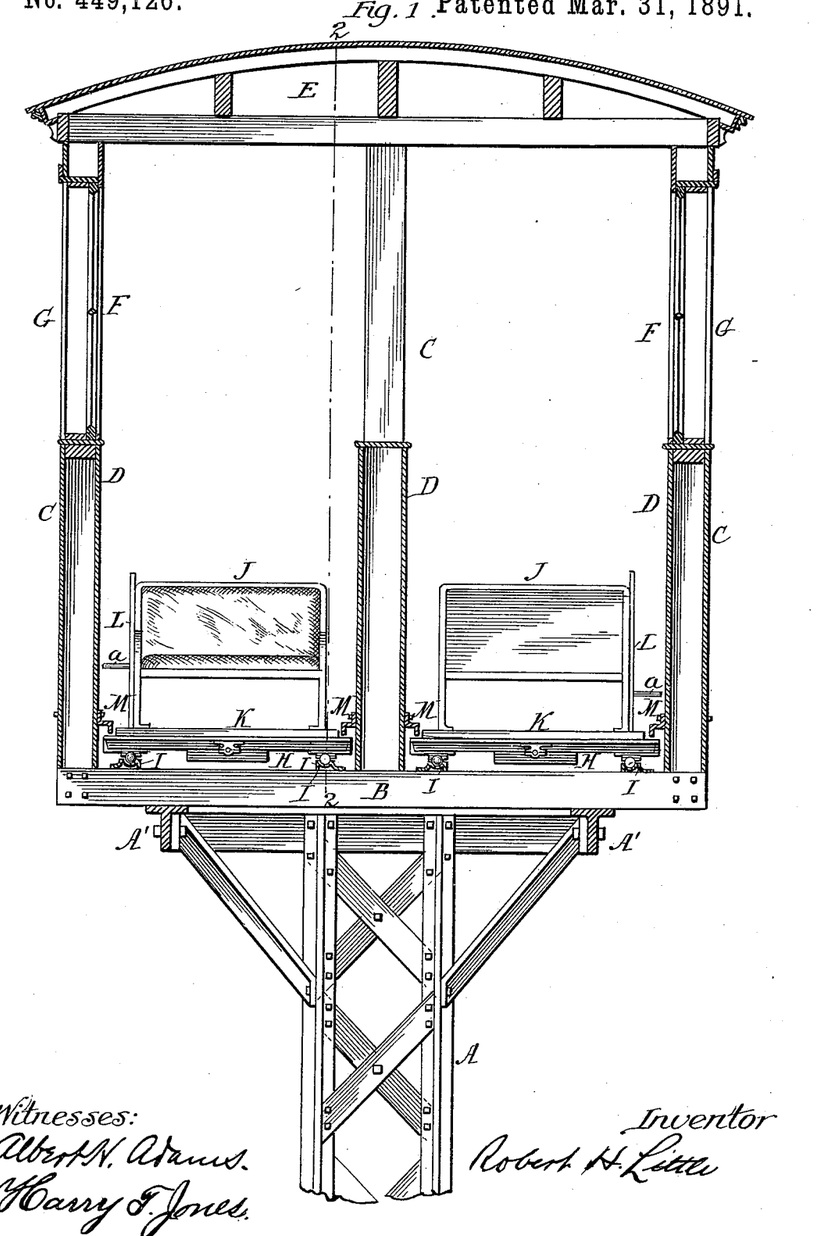
Figure 1 is a cross-section.

As shown in Fig. 1, my improvements are applied to an elevated roadway, to which they are especially adapted, as by the use of my improvements the roadway is much narrower and lighter than roadways heretofore in use, and may be mounted upon single standards, a suitable form for which is shown in said figure, A being suitable posts or uprights, and A' being side rails connecting the posts together. Upon this frame-work, which is usually made of iron, there is mounted a covered way, consisting of the sills or beams B, posts C, which are boarded up, as at D, on the inside a distance to protect passengers from any projecting part, and which are continued up to support any suitable covering or roof E, which should be about seven feet above the carrier, thus making a continuous covered and inclosed passenger roadway excepting at the landing-stations, where sufficient side openings are made to land and receive passengers.

Figure 8:
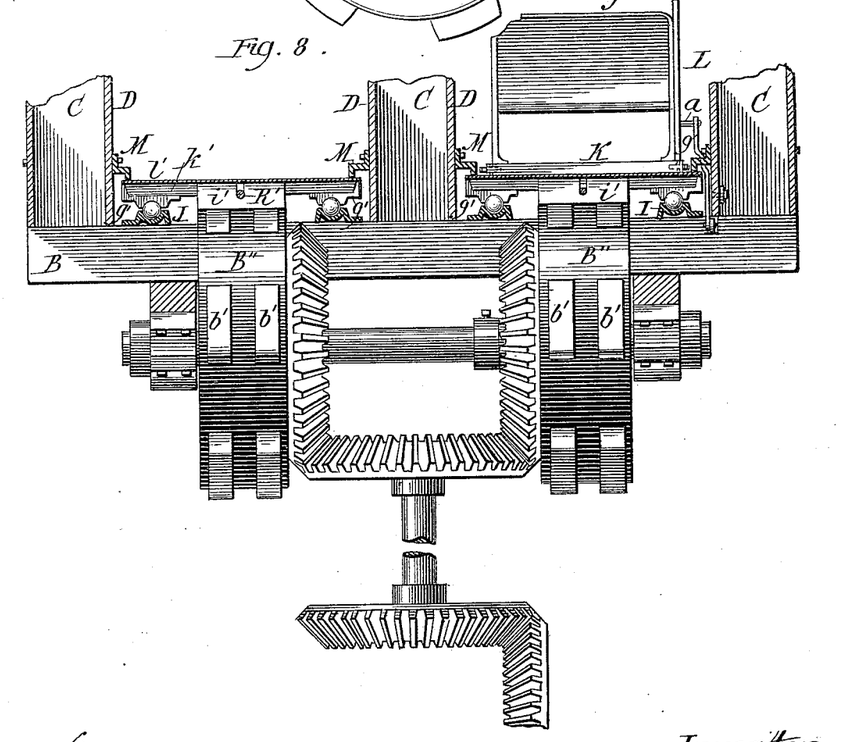
Fig. 8 is a cross-section, showing gearing for driving the endless carrier.
Figure 12:
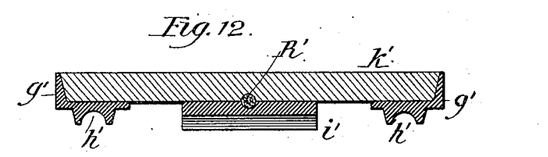
Figs. 12, 13, and 14 are details of the carrier.
Figure 13:
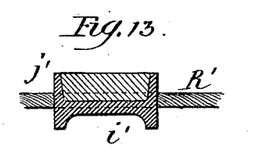
Figures 14, 15:
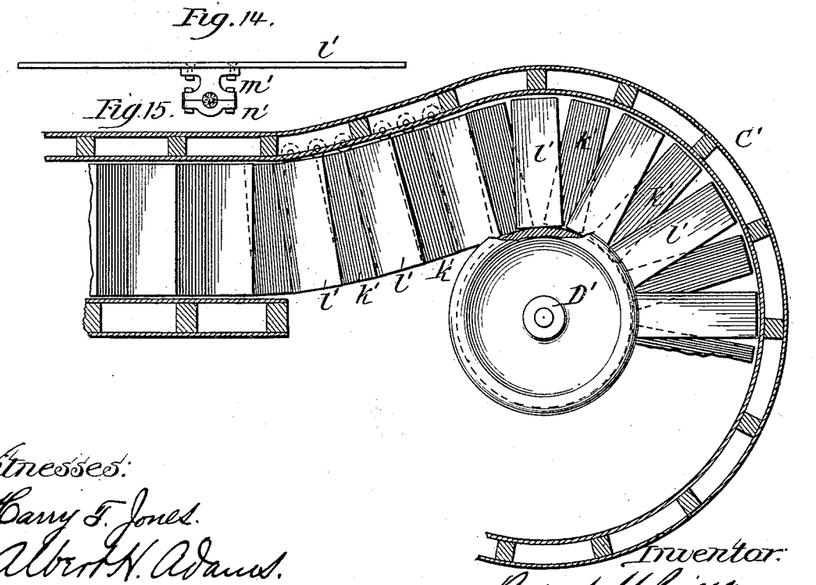
Fig. 15 is a horizontal section, showing the movement of the carrier at the end or on curves.

Upon the sills B are mounted rails I, the bearing-surfaces of which are made semi-cylindrical to receive bearing-balls, as shown in Figs. 1 and 8. The carrier, which is mounted and travels upon these rails and bearing-balls, is composed of separate sections $k'$ $l'$. The sections $l'$ overlap the sections $k'$. The sections $k'$ are shown in detail in Figs. 12 and 13, and to avoid weight they are preferably made of wood, provided with end castings $g'$, which are provided with semicircular under-grooves $b'$, which rest upon the bearing-balls. The middle portion of the section is provided with a casting $i'$, which is attached to the section by flanges, as shown in Fig. 13, which are securely fastened to the wood, and by means of which the sections are clamped securely to the rope R'. The sections $l'$ may be made of wood or metal, and they are provided with brackets $m'$ at the middle, which are firmly attached thereto, and a clamping-section $n'$, which by means of vertical bolts also clamp these sections firmly to the rope R'. The rope being in the middle, the sections are flexible in relation to each other, and for passing around at the ends of the line, as shown in Fig. 15, or in passing curves they slide upon each other, so as not to bind nor interfere with the turning or curving of the carrier in its pathway. These sections are prevented from rising or falling, and also from tipping, by means of continuous flanges M, applied to the framing, as shown in Figs. 1, 8, and elsewhere. These flanges M are also so formed as to serve as guides for preventing the seats or seat-bases from coming out of position while in motion.

Figure 7:
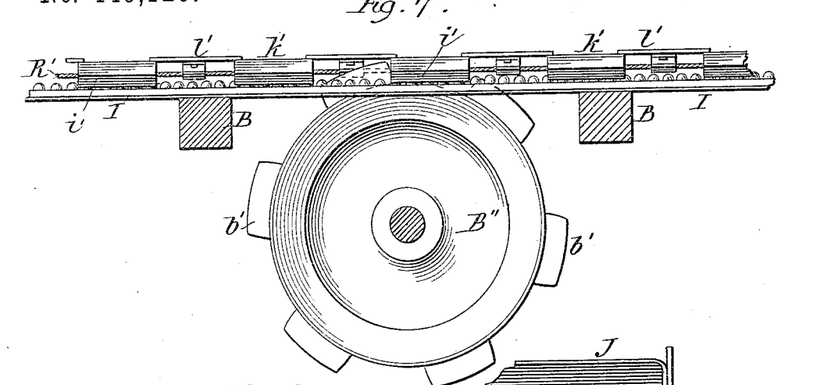
Fig. 7 is a longitudinal section on line 7 7 of Fig. 5.
Figure 10:
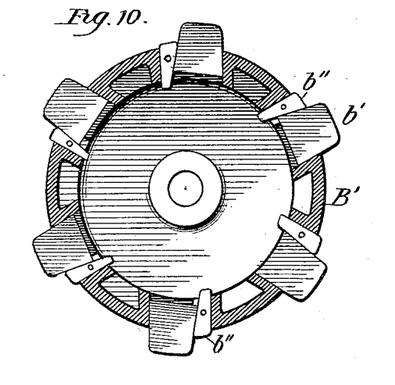
Figs. 10 and 11 are details of the driving-wheels.
Figure 11:
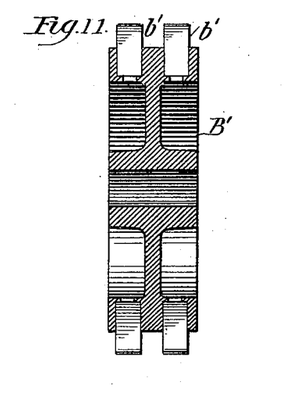

The arrangement of the carrier or moving platform in upper and lower sections not only gives the advantage of producing a flexible carrier, but it also provides means for driving the same, as shown in Fig. 7, the under sections $k'$ being connected by the castings i', which are firmly attached to the rope R', so as to furnish a hold for the cogs or projections b' of the driving-wheels B''. The driving-wheels B'' are propelled in opposite directions, as shown in Fig. 8, by a system of bevel-wheels, as there shown, or by other suitable means connected with the engine or other driving power. As many connections for driving as may be necessary can be made, according to the length of the line. The cogs or projections b' are best made of wood, placed in position, as shown in Fig. 10, and locked by means of keys b'' or by other suitable means. Wooden cogs or projections are provided, as they give out less noise than metal ones; but where this is not considered important metal cogs may be used. Whatever the material may be, it is desirable to make them detachable, so that they may be renewed without renewing the entire wheel. They are also by preference made with a space between them, as shown, so as to straddle or fork the rope, and thereby give a bearing both above and below and at both sides of the rope to reduce the liability of tipping or turning the sections with which they come in contact.

Figure 9:
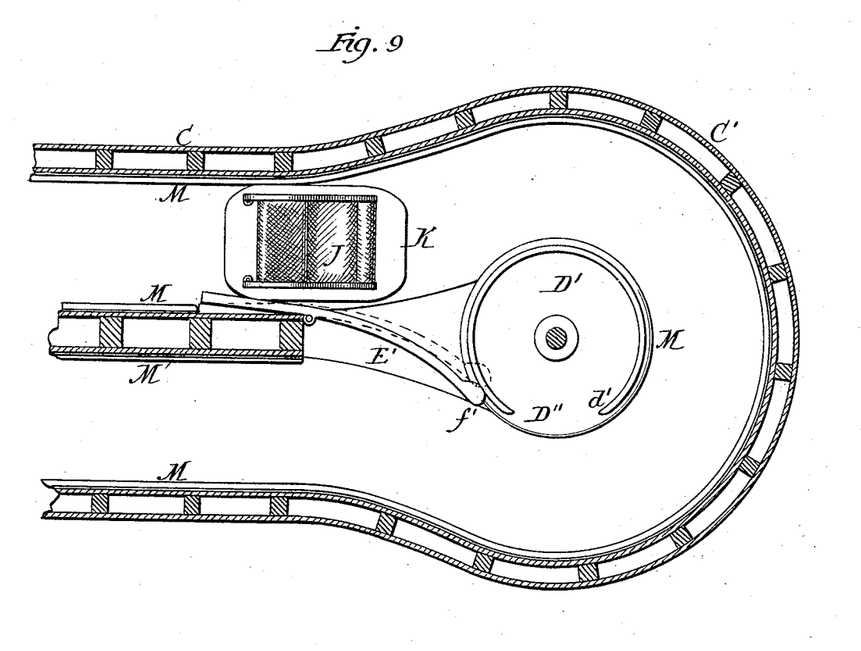
Fig. 9 is a horizontal section at the end of the line.

For turning or running on curves antifriction rolls may be used, as indicated by the dotted lines in Fig. 15, and for turning at the end a center wheel D', which is permitted to rotate on its axis, is provided with an overhanging flange, which takes the place of the bearing or guide M at that place. This wheel D', as shown in Fig. 9, is also provided with a vertical flange having an opening, as at D'', which, in connection with the lever or arm E', spaces the distance between the seat-platforms, so as to prevent their becoming piled up or arranged too close together by turning at the ends. In the position shown, the seat-platform K is locked in place by the projecting end of the pivoted lever E', where it will remain until the center wheel D' has turned, so as to allow the end f'' of the lever to enter the opening D'', when the lever E' will assume the position indicated by the dotted lines and permit the platform K and its seat or chair J to move on. As the wheel D' continues its rotation, the end of the flange d' will strike the end f'' of the lever and return it again to the position to hold the next seat-platform until it is released in a similar manner. I have shown this spacing device only at the ends of the line; but it is evident that similar devices may be placed intermediately, so as to properly space the seat-platforms at other points along the line. From this description it will be readily understood that the carrier H composed of sections k' l', as described, is designed to be kept in motion.

Figure 2:
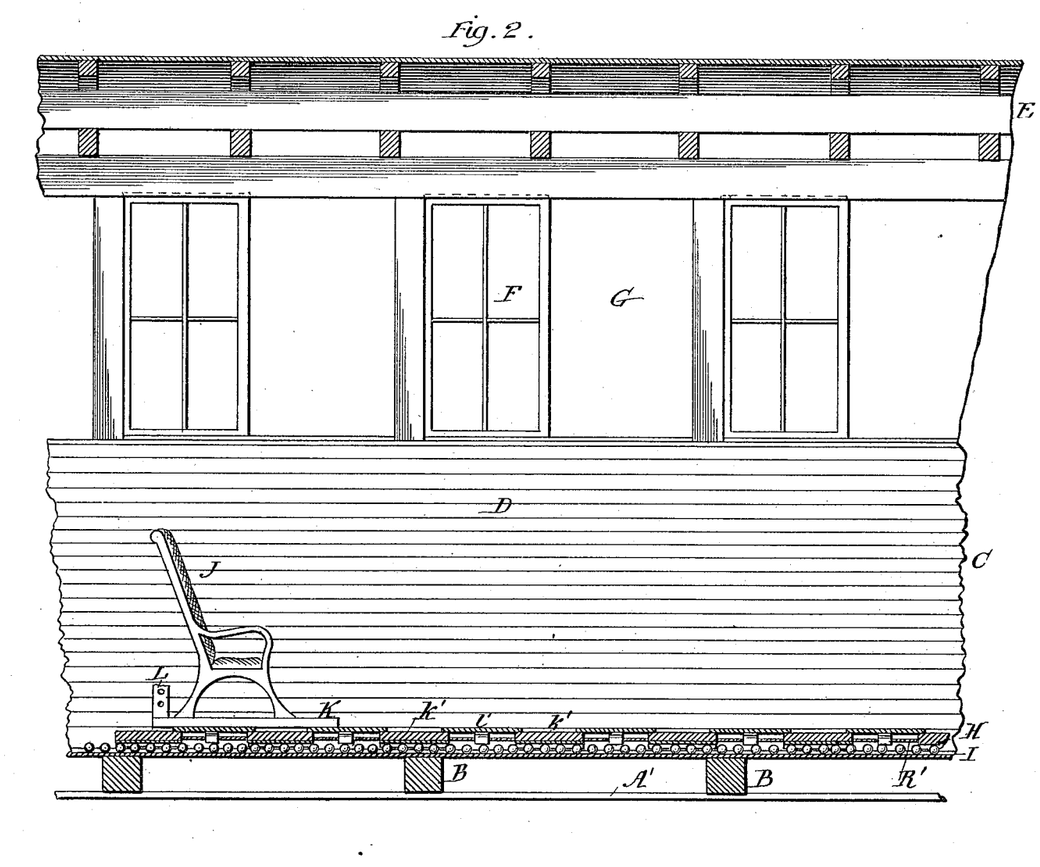
Fig. 2 is a longitudinal section at line 2 2 of Fig. 1.

The persons to be transported are taken either singly or in pairs on the seats J, which are mounted upon bases or platforms K, which rest loosely upon the carrier H, as shown in Figs. 1 and 2. The platforms are of a sufficient size to properly support the seats J and the feet of the passengers.

The seats or chairs are of any suitable form, and are provided with arms to prevent the passenger from coming in contact with the walls or being unseated by any side movement of the chair. Each chair or carriage is provided with a bar L, having a series of holes, into either of which holes a pin a may be inserted for the purpose hereinafter explained.

Figures 3, 4:
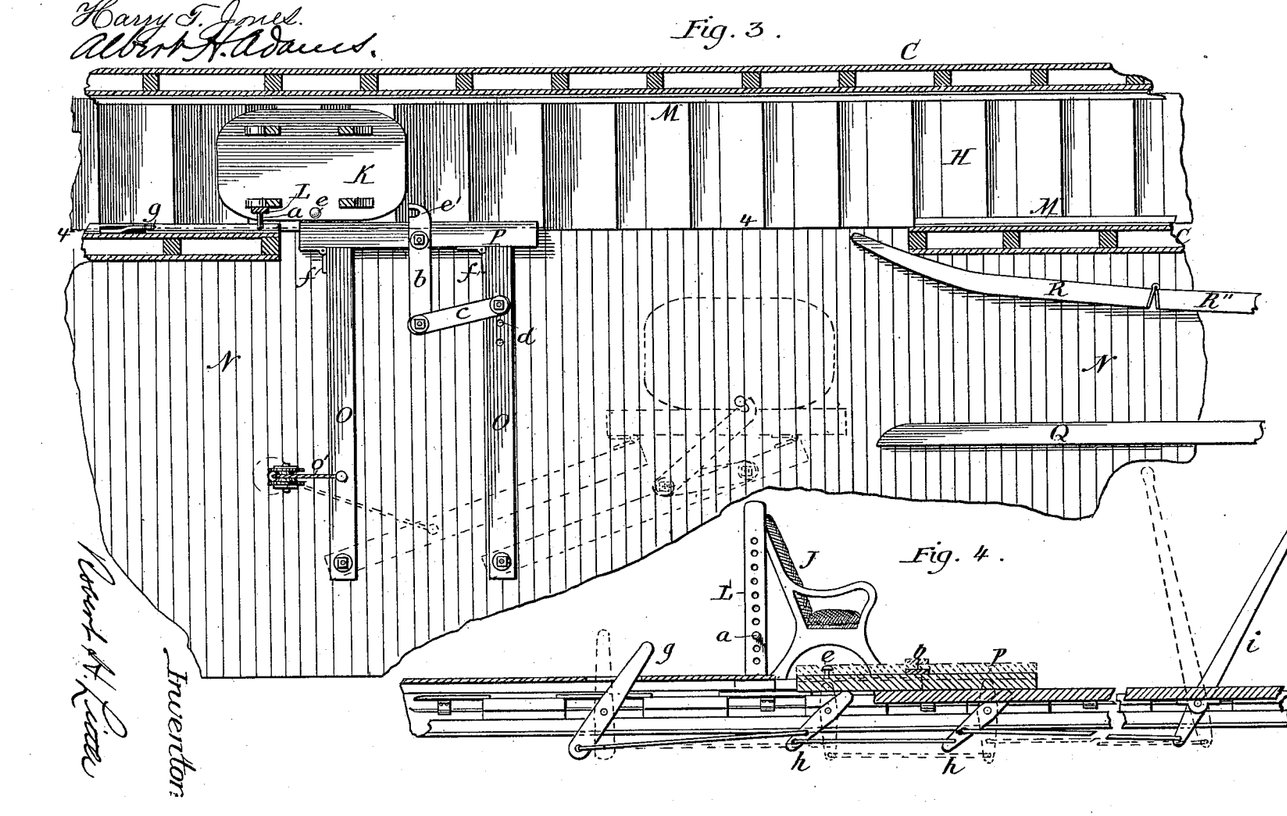
Fig. 3 is a horizontal section showing a landing-platform, partly broken away.
Fig. 4 is a vertical section on line 4 4 of Fig. 3.
Figures 5, 6:
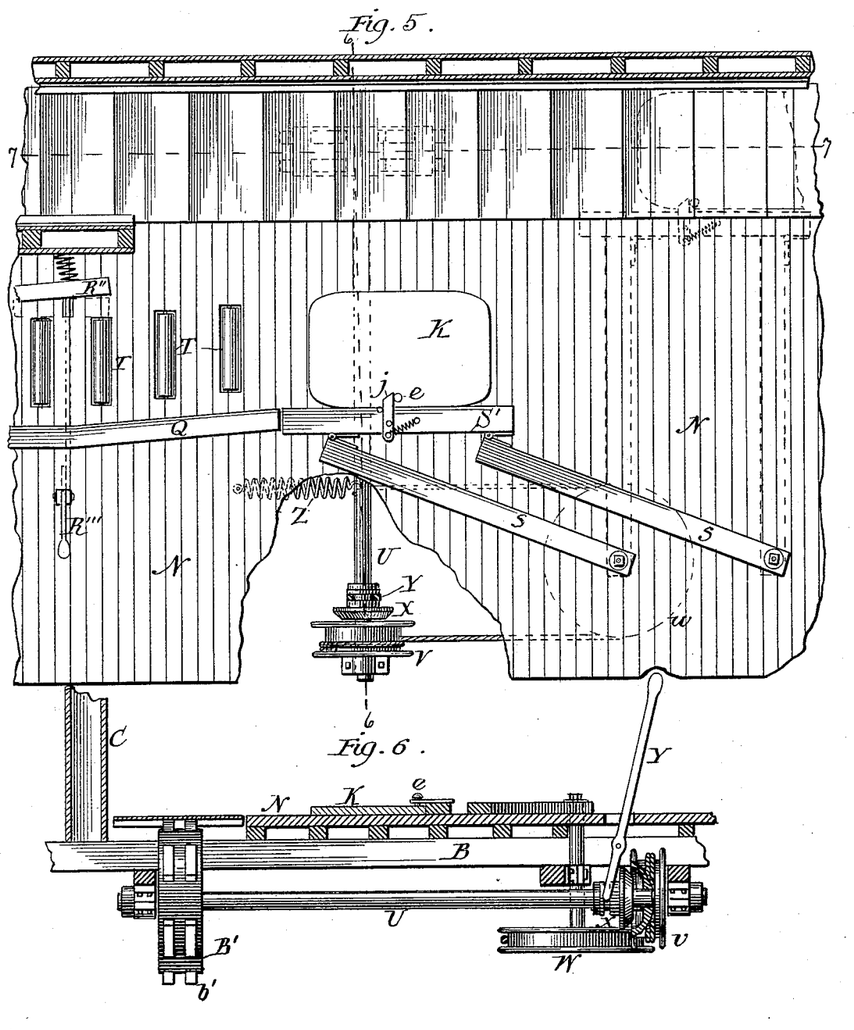
Fig. 5 is a horizontal section, showing a continuation of the landing-platform.
Fig. 6 is a cross-section on line 6 6 of Fig. 5.

For the purpose of taking off and receiving passengers the side platforms are provided, as shown in Figs. 3 and 5, the platform of Fig. 5 being a continuation of that shown in Fig. 3. These platforms are to be provided with suitable steps or stairways to give convenient access thereto; and for the purpose of landing the passengers or a seat I provide apparatus, as shown in Fig. 3, which consists of pivoted parallel bars O, which are held in position shown by the full lines by a rope O', which runs over a sheave and has a weight attached to its end beneath the platform. At the ends adjoining the traveling carrier these bars are connected by a cross-bar P hinged thereto, as at f, and pivoted to this bar P is a short bar having a hook, as e', and a link c, which link may be adjusted by the holes d in one of the bars O. Instead of the holes d a slot may be placed therein so that the links c can be more readily adjusted.

Each base or platform K of the seat J is provided with a pin e, which, when the parallel bar-frame O P is in contact with the platform or floor M, will engage with the hook e', and by the continued motion of the platform the parallel bars will assume the position shown by the dotted lines in Fig. 3, and land the base and its seat with the passenger on the platform N, as indicated. When the parallel bars are in the position indicated by dotted lines, the base K will be released from the hook e', and to prevent the too sudden stoppage of the base it is permitted to pass on between the bars Q R, the bar R having a hinged section R'', which is supported by a spring, as shown in Fig. 5, which bar R'' will stop the progress of the base K on the platform N.

For the purpose of releasing the chair-base from the locking-bar R'', it is connected by a suitable link with a hand-lever R''', by which the hinged section R'' of the bar can be thrown back to permit the chair-base to be moved along to the position for being reoccupied by a passenger. For the purpose of avoiding friction rollers T may be placed on the platform N, as shown in Fig. 5, and when the base K is in the position there shown, it is connected with another pair of parallel bars S, and hooked to the end bar S', which parallel bars are similar in construction to the bars O P, but operate in the opposite direction. A pivoted bar j is connected with the bar S, and projects therefrom sufficiently to give contact with the pin e of the base, and in order to place the base upon the carrier, these parallel bars S are put in motion by means of a rope connected at one end with a spring Z, which is carried around a wheel or drum W and wound upon the drum V, which is mounted upon a shaft U. The drum V is provided with a friction-clutch X, operated by a hand-lever Y. The shaft is continuously rotated by a wheel B', which is constructed similar to the wheels B'' and is driven by the carrier. The wheel or drum W has its axis projecting above the platform, to which one of the bars S is firmly attached, so that the rotation of the wheel W causes the frame of parallel bars to move toward the carrier and to land the base K, with its passenger, upon the carrier, as indicated by the dotted lines in Fig. 5, ready to proceed. It will be understood that as many of these platforms or landings as are necessary are to be provided, and that each one is to be provided with a sufficient number of attendants to properly operate the station.

As it will not be desirable for passengers to be landed and started at intermediate stations, I have provided an arrangement, as shown in Fig. 4, by which the seats for passengers may be permitted to pass stations or stop, as desired. Each seat or base is provided with an arm L, having a series of holes in which a pin $a$ may be placed. These pins are designed to come in contact with a lever $g$, located at the different stations, which levers are of different lengths for each station or landing. If a passenger desires to land at the second station of the road, the pin $a$ will be placed in the last hole of the bar L, in which position it will come in contact with the lever $g$, which is connected by links with the pivoted bars, as shown in said Fig. 4, and throw them into the inclined position shown by the full lines, in which position the bar P is lowered, so as to rest upon the platform N, when the hook $e'$ will engage with the pin $e$ on the base K and remove the base with its seat to the landing-platform, as hereinbefore described. If the passenger desires to be landed at the second station, then the pin $a$ will be placed in the second hole, in which position it will pass over the top of the lever $g$ at the No. 1 station and will come in contact with the lever at station No. 2, and so on until the pin is placed in the proper hole, which will operate the lever $g$ at the last station. The levers $g$ are placed in position by the attendant using the hand-lever $i$, which is located in any suitable place on the platform out of the way. When the levers $g$ are in the upright position, the bar P is held up, as indicated by the dotted lines in Fig. 4, so that the pin $e$ of the base K passes under the hook $e'$ of the bar $b$. If any mistake is made in locating the pin $a$, the passenger signals to the attendant to stop. The attendant can land the chair and its occupant by means of the lever $i$, which he ordinarily uses for the purpose of replacing the lever $g$ in position, and by the use of the same lever empty chairs can be taken off whenever desired without regard to the location of the pin $a$. By this arrangement of a covered passage-way I avoid the necessity of constructing covered carriages or cars, and by providing a passage-way with sliding windows F of about the same width as the covered spaces B the covered way may be properly ventilated, and these windows may be connected together between stations by cords, so that the attendants at the station can close them in case of storms or open them, as may be necessary.

By using the continuously-moving carrier passengers are disposed of as rapidly as they come to the stations, so that there is no huddling of the passengers as where cars are used and no crowds are gathered at the stations, and as the stations are patronized, and as there are more passengers during certain portions of the day than at others, each station may be provided with means for holding several of these chairs when out of use during the portions of the day when comparatively few are traveling, and also in readiness to take any usual number of passengers patronizing any particular station.

The rope R', as shown, is a wire cable; but it is evident that with this construction of carrier the sections may be looped together by links or sections of chains instead of using a continuous cable.

What I claim as new, and desire to secure by Letters Patent, is—

1. In a passenger-railway, the combination of a continuously-moving carrier and its supporting-rails with a removable seat, substantially as and for the purpose specified.

2. In a passenger-railway, the combination of the continuously-moving carrier and its supporting-rails with a covered passage-way, whereby the use of covered carriages is avoided, substantially as specified.

3. In a passenger-railway, a continuously-moving carrier, in combination with landings or platforms provided with means for receiving and landing passengers, substantially as specified.

4. The combination, with a base K, having a pin $e$, with the landing-frame O P, and hooked bar $b$ and link $c$, substantially as specified.

5. The combination of the base K, having the bar L and pin $a$, with the lever $g$, constructed and operating substantially as specified.

6. The combination of the platform N and bar Q with the bar R, hinged bar R'', and lever R''', substantially as specified.

7. The combination of the bars S S' with the wheels or drums V W, cord and spring Z, constructed and operating substantially as specified.

8. The combination of the drum D', having the vertical flange and side opening D'', with the pivoted lever or bar E', substantially as and for the purpose specified.

9. The driving-wheel B'', having the cogs or projections b', with the spaces between them, in combination with the sections k', having the castings i', substantially as specified.

10. The combination of the sections k' and l' with the rope R', substantially as and for the purpose specified.

ROBERT H. LITTLE.

Witnesses:
HARRY T. JONES,
L. L. BOND.